(12) United States Patent
Vandrilla

(10) Patent No.: US 8,468,044 B2
(45) Date of Patent: *Jun. 18, 2013

(54) JUST-IN-TIME INSURER'S FLOORING EVALUATION AND REPLACEMENT SYSTEM

(76) Inventor: Steven J. Vandrilla, Okalahoma City, OK (US)

(*) Notice: Subject to any disclaimer, the term of this patent is extended or adjusted under 35 U.S.C. 154(b) by 285 days.

This patent is subject to a terminal disclaimer.

(21) Appl. No.: 12/781,544

(22) Filed: May 17, 2010

(65) Prior Publication Data

US 2010/0318382 A1   Dec. 16, 2010

Related U.S. Application Data

(63) Continuation of application No. 10/960,832, filed on Oct. 7, 2004, now Pat. No. 7,747,460.

(51) Int. Cl.
*G06F 17/30* (2006.01)

(52) U.S. Cl.
USPC ............................................. 705/7.11

(58) Field of Classification Search
USPC ............................................. 705/7.11
See application file for complete search history.

(56) References Cited

U.S. PATENT DOCUMENTS

| | | | | |
|---|---|---|---|---|
| 5,189,606 | A * | 2/1993 | Burns et al. ................. | 705/7.23 |
| 7,006,977 | B1 * | 2/2006 | Attra et al. .................. | 705/313 |
| 7,389,255 | B2 * | 6/2008 | Formisano .................. | 705/7.23 |
| 2005/0021356 | A1 * | 1/2005 | Thompson .................. | 705/1 |

OTHER PUBLICATIONS

"CRI" Carpet and Rug Institute's Performance Standards and Specifications Committee of Carpet Industries Members (Carpet Specifications Guidelines), Dec. 2000, The Carpet Rug Institute. pp. 1-84.*

* cited by examiner

*Primary Examiner* — Romain Jeanty
(74) *Attorney, Agent, or Firm* — Dunlap Codding, P.C.

(57) ABSTRACT

The present invention is directed to a system, and method for making and using the same, for an on-site evaluation of flooring materials, condition, and value, and further, for providing replacement flooring. The present invention provides an effective and uniform way to more objectively evaluate flooring and/or provide replacement flooring to the benefit of both an insurer and a customer. More specifically, the present invention relates to a flooring evaluation system which includes flooring evaluators equipped with a portable apparatus for evaluating flooring which includes an objective evaluation approach using evaluation logic to determine a current monetary market value, or "as new" or pre-use value, which takes into account flooring characteristics, and/or a depreciated value which takes into account loss factors such as wear, appearance, and other degradative considerations. Further, the system of the present invention can include flooring providers which participate in the installation of a selected replacement flooring. The present invention is directed to an interconnected system which includes estimation logic, project management logic and installation logic for managing an insurance claim from start to finish in a just in time fashion.

8 Claims, 12 Drawing Sheets

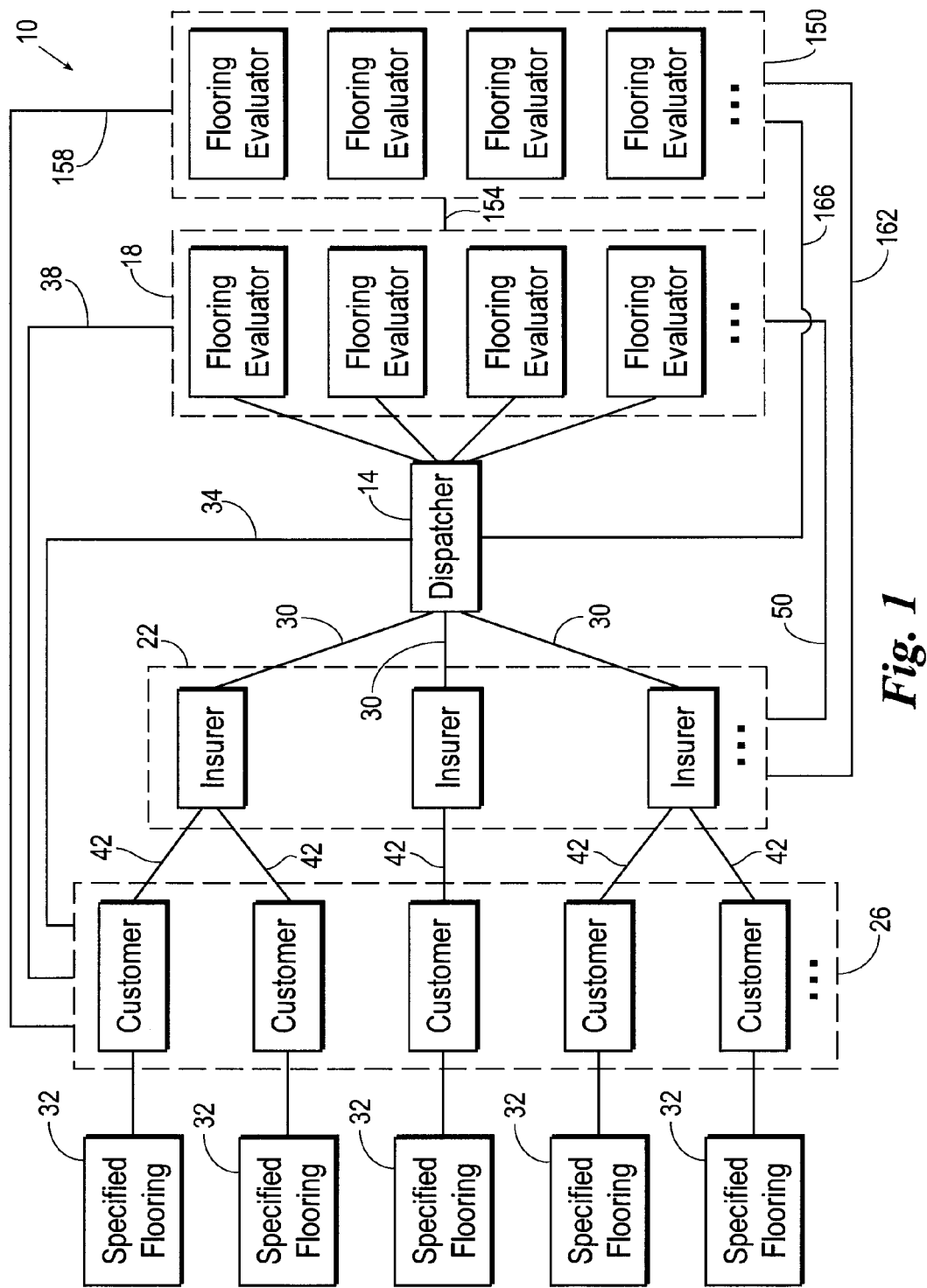

Please Enter Customer's Information

First Name [                    ]   Last Name [                    ]

Street Address [                              ]

City [            ]   State [            ]   Zip Code [            ]

Daytime Phone [            ]   Evening Phone [            ]

Insurance Company [                    ]   Policy Number [            ]

Evaluator Name [            ]   Evaluator Company [                    ]

Comments
[                                                            ]

[ Next ]   [ Cancel ]

*Fig. 3*

1. Identify fiber type and enter number

Premium Filament Nylon = 16    Olefin/nylon blend = 5
   Filament Nylon = 13            Olefin/PP = 4
   Staple Nylon = 10              Wool blend = 20
   Polyester = 7                  100% Wool = 30

2. Pile, (height / twist / density), rate scale, enter number

Low twist rate...
   Low density     1/4"=3   3/8"=2   1/2"=1    3/4"=0    1"=0    1 1/4"=0
   Med. density    1/4"=4   3/8"=3   1/2"=2    3/4"=1    1"=0    1 1/4"=0
   High density    1/4"=5   3/8"=4            =3    3/4"=2    1"=1    1 1/4"=0
   Medium twist rate...
   Low density     1/4"=6   3/8"=5   1/2"=5    3/4"=4    1"=3    1 1/4"=2
   Med. density    1/4"=7   3/8"=6   1/2"=6    3/4"=5    1"=4    1 1/4"=3
   High density    1/4"=8   3/8"=7   1/2"=7    3/4"=6    1"=5    1 1/4"=4
   High twist rate...
   Low density     1/4"=7   3/8"=8   1/2"=8    3/4"=7    1"=6    1 1/4"=6
   Med. density    1/4"=8   3/8"=9   1/2"=10   3/4"=11   1"=10   1 1/4"=9
   High density    1/4"=11  3/8"=12  1/2"=13   3/4"=14   1"=15   1 1/4"=16

3. Ounce weight per sq. yd. / tufted carpet

Enter one half of sq. yd. Weight = sq. yd. Weight x 0.5

4. Ounce weight per sq. yd. / woven

Enter entire weight per sq. yd. = sq. yd. Weight x 1.0

5. Tufted backing / enter number

Polypropylene...
   ☐     open = 1                 high pick = 3
   ☐     medium density = 2       special woven or soft = 4

6. Style Elements choose only one and enter:

Commodity / builder grade  -4     Cut and loop  +4
   Saxony  +2                        Berber loop Olefin  +1
   Velvet  +4                        Berber loop nylon  +4
   Texture  +3                       Sculptured Saxony  +2

7. High style elements choose one and enter:

Pattern cut pile add  5
   Exotic blend of yarns or special treatments pile height < 3/4" = 5
   pile height > 3/4" = 8

*Fig. 10a*

| DEPRECIATED VALUE / SUBTRACT FOLLOWING ELEMENTS |
|---|
| 1. Enter loss by age<br>    1. Nylon / Enter the number of years old<br>    2. Polyester / Enter one and one half years old ☐<br>    3. Wool / Enter half the number of years old<br>    4. Wool Blend / Enter three fourths of the number of years old<br>    5. Olefin and Olefin Blends / Enter one and one fourth of years old |
| 2. Enter loss of twist number ☐<br>    High = 6      Low = 2<br>    Medium = 4    None = 0 |
| 3. Enter loss of texture ☐<br>    High = 6      Low = 2<br>    Medium = 4    None = 0 |
| 4. Enter stain level ☐<br>    High = 6      Low = 2<br>    Medium = 4    None = 0 |
| 5. Enter fade level ☐<br>    High = 6      Low = 2<br>    Medium = 4    None = 0 |

*Fig. 10b*

JUST-IN-TIME INSURER'S FLOORING EVALUATION AND REPLACEMENT SYSTEM

CROSS-REFERENCE TO RELATED APPLICATIONS

This application is a continuation of, and claims the benefit of, U.S. patent application Ser. No. 10/960,832, filed Oct. 7, 2004, now U.S. Pat. No. 7,747,460 the entire content of which is hereby incorporated herein by reference in its entirety.

BACKGROUND OF THE INVENTION

Property insurers, such as insurance companies and other adjusting companies, have long dealt with problems associated with the replacement of damaged flooring in residential and commercial buildings of those they insure. A major expense is felt by both an insurer and a customer, or insured flooring owner, due to time expended during both the evaluation of the claim and restitution of the damaged flooring. Generally, in addition to the cost of replacement or restoration, the insurer also faces lodging expenses incurred by the customer if the damaged flooring creates an inhabitable condition in the building. Additionally, whether the building is a home or a business, the customer is inconvenienced until the replacement of the damaged flooring is completed, especially if the building cannot be fully utilized.

Presently, monetary value relationships for flooring generally rely on a subjective valuation. For example, one method used by insurers is to agree in advance with the customer on a monetary worth for a specified flooring owned by the customer when an insurance policy or agreement is formed. One problem is that such a method can produce disparate results. If the flooring is overvalued, then the insurer pays more than the flooring is worth. If the flooring is undervalued, the customer will only receive the agreed upon amount and will often be dissatisfied, especially if prices of equivalent replacement flooring have substantially increased above the agreed amount the customer will receive.

Another method often employed by insurers to determine the value of the existing flooring in order to settle damage claims is to require the customer to "get two quotes" from two independent flooring retailers which estimate the cost of replacement flooring. Generally, one quote, or an average of both quotes, is used to determine the amount of monetary coverage that will be allotted to the customer by the insurer. Such a practice can result in fraud by the retailer to the detriment of the insurer, for example, when the retailer "buries" a deductible by adding extra cost so as to effectively pass the expense of the deductible to the insurer. Also, since the customer is responsible for the acquisition of the quotes, further delay and/or high-price quotes may result, further adding to the cost incurred by the insurer.

An alternative method often used by insurers is to send a sample of the damaged flooring to a remote laboratory so that laboratory technicians can determine certain specifications for the composition and construction of the flooring so that comparably equivalent replacement flooring with similar composition and construction can be determined and/or suggested. Laboratory testing can be both costly and time consuming, as laboratory results and replacement flooring suggestions are not returned until several working days after samples have been sent out and received by the laboratory. Such delay can result in further inconvenience to the customer and added hotel and other expenses to the insurer. Further, the evaluation does not always result in a fair assessment since the tester or technician of the damaged flooring is in a laboratory remotely located from the flooring site and has not seen the actual applied flooring, and are instead dependent on the subjective selection of samples by an adjuster.

The current methods of assigning values of monetary worth to flooring, such as for example those discussed above, which involve subjective methods and/or non-expert assessments, often result in unfair value assignments and dissatisfaction, or possibly even litigation, between the insurer and the customer. A major problem with current subjective and comparative methods is that such methods do not allow for an objective scientific evaluation to determine an initial monetary market value of the specified flooring, i.e. a value of the specified flooring in new, pre-use condition, or further, to determine a devaluated monetary market value, i.e. a value of the specified flooring taking into consideration the loss of value or depreciated value of the specified flooring caused by normal wear or abuse incurred during the life of the specified flooring. The determination of the devaluated monetary market value is especially beneficial, because when degradation due to such loss factors as aging, staining, wear, and tear of the specified flooring are not taken into account to devalue the specified flooring, the insurer may pay more than the realistic current worth of the specified flooring.

To Applicant's knowledge there is no interconnected system which includes estimation logic, project management logic and installation logic for managing an insurance claim from start to finish in a just in time fashion.

Thus, a need exists for a flooring evaluation system which more objectively assigns monetary market value to flooring, and more specifically, but not by way of limitation, which more objectively assigns an initial monetary market value and/or a devaluated monetary market value in a timely and efficient manner, so as to facilitate the providing of restitution to customers and to reduce costs of expenditures, inconvenience, and delays incurred by customers and/or insurers. It is to such a flooring evaluation system that the present invention is directed.

BRIEF DESCRIPTION OF THE SEVERAL DRAWINGS

FIG. 1 is a diagram of a system for evaluating flooring constructed in accordance with the present invention.

FIG. 2b shows the elements and the logic flow diagram for a flooring evaluator of the flooring evaluation system depicted in FIG. 2a.

FIG. 3 shows one embodiment of a program module for project information input.

FIGS. 8a-e show embodiments of program modules for evaluation information input.

Figure 9:
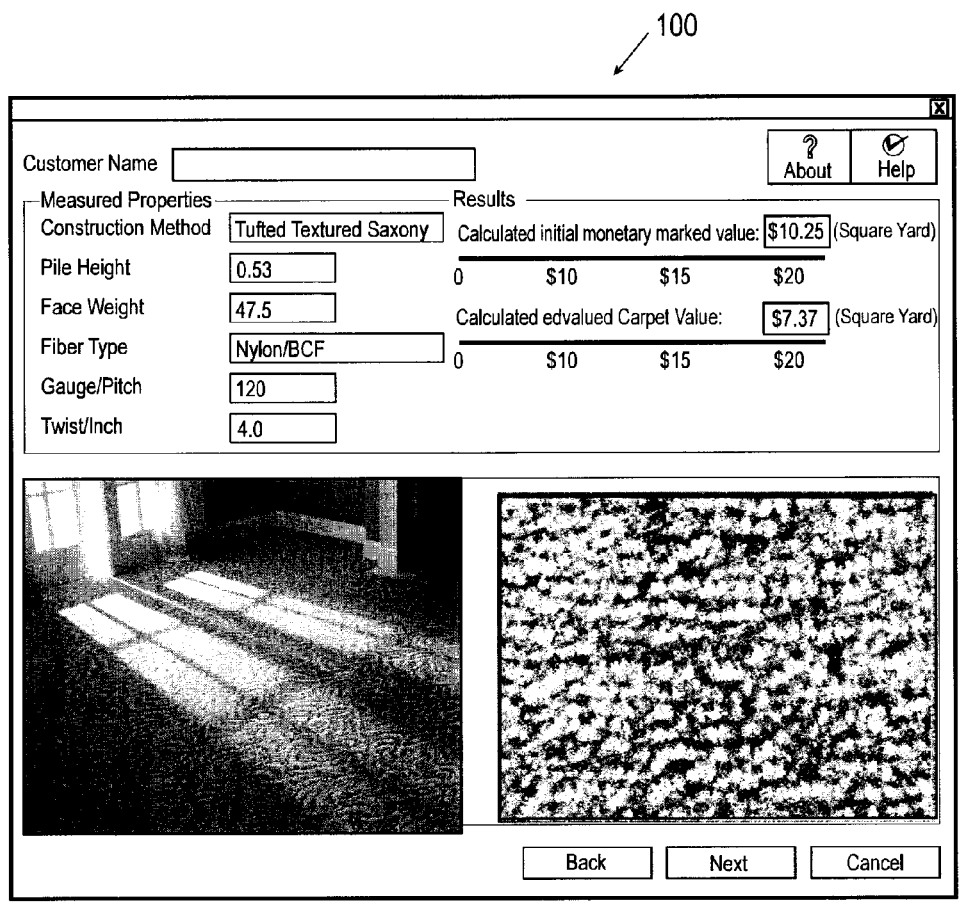

FIG. 9 shows a report constructed in accordance with the present invention.

FIG. 10a is a chart for one embodiment of determining an initial monetary market value in accordance with the present invention.

FIG. 10b is a chart for one embodiment of determining a devaluated monetary market value in accordance with the present invention.

DETAILED DESCRIPTION OF THE INVENTION

Referring now to the drawings and more particularly to FIG. 1, shown therein is one embodiment of a flooring evaluation system 10 for evaluating flooring, which can include carpet, padding, hardwood, tile, linoleum, vinyl, or laminate. The flooring evaluation system 10 can be considered a just in time system for an insurer that can be used to take a flooring claim from a first notification of the insurer, to a project managing and reporting tool, to an estimating tool, to a product identifying module, to a value and pricing algorithm, to product selection, to direct search of mill and retailer inventory, to ordering, to installation scheduling culminating with data input into a risk management tool—all following preset requirements of the particular insurer. The system 10 maintains digital records and preferably handles all legal paperwork including sign offs and notifications to the insured and delivers hard copies to the insured as well as sends all featured reports by satellite connection from a flooring site in a just in time fashion to the insurer. In one preferred embodiment all of the different features (including estimations, reports and risk management) of the flooring evaluation system 10 are incorporated into a single software system such that when the insured stays within the predetermined confines of the insurance program, all legal and scheduling facets of the insurance program are able to be completed on the first appointment.

Generally, the flooring evaluation system 10 includes a dispatcher 14, a plurality of flooring evaluators 18, a plurality of insurers 22, and a plurality of customers 26. In one preferred embodiment, when a specified flooring 32 of the customer 26 is damaged, the customer 26 will request a flooring evaluation of the specified flooring 32 so that the customer 26 can seek restitution from the insurer 22, e.g. through an agreement or insurance policy between the insurer 22 and customer 26. To facilitate the performance of the flooring evaluation, the request is received by the dispatcher 14, which selects one of the flooring evaluators 18 to perform the flooring evaluation at the site of the specified flooring 32. Evaluation information determined from the flooring evaluation is then utilized in providing restitution to the customer 26. In one preferred embodiment, the evaluation information is utilized in conjunction with evaluation logic to determine, automatically, a current monetary market value, as well as a devaluated monetary market value, for the specified flooring 32. In another preferred embodiment, the flooring evaluator 18 can further cause the installation of replacement flooring. The current monetary market value can be a retail price, a cost of manufacturing price, or a wholesale price. The evaluation logic can be run on a computer associated with a web site so that access to the evaluation logic is provided through the web site via a global network, such as the Internet. Alternatively, the evaluation logic can be implemented as a JAVA applet.

The dispatcher 14 can be any system, which may include an individual, corporation, and/or automated system, such as a computer system, which is capable of receiving and conveying information to a number of affiliated, independent and/or non-affiliated entities, including at least one flooring evaluator 18, insurer 22, and/or customer 26. The particular flooring evaluators 18, insurers 22, and/or customers 26 conveying and/or receiving information from the dispatcher 14 are not necessarily chosen by the dispatcher 14. For example, the dispatcher 14 can include a call center capable of receiving and conveying information via individuals, e.g. human personnel, and a telephone network, and/or the dispatcher 14 can include an internet web site capable of conveying and receiving information via a public and/or global network, such as the world wide web.

The dispatcher 14 is capable of selectively receiving, and dispensing project information indicative of a request for performance of a flooring evaluation. The dispatcher 14 is also capable of receiving, and dispensing completed project information indicative of the performance of a flooring evaluation. In one preferred embodiment, the project information and/or the completed project information is also stored by the dispatcher 14.

The plurality of insurers 22 are shown in communication with the dispatcher 14 via a communication channel 30. The communication channel 30 may be any communication median capable of conveying and receiving information between the dispatcher 14 and the insurer 22, such as an analog or digital telephone line, cable, fiber-optic line, wireless or other electronic communication median, human median, and/or any newly developed communication median for communication between the dispatcher 14 and the insurer 22.

Generally, at least one of the plurality of insurers 22 receives a request for a flooring evaluation from at least one of the plurality of customers 26, generally from a customer 26 which has coverage by contract, such as an insurance policy, with the at least one insurer 22 whereby the at least one insurer 22 undertakes to indemnify, guarantee, or provide restitution to the customer 26 against loss by damage, or other incident defined by the contract, incurred by the specified flooring 32 owned by the customer 26. It should be noted that although the present invention is discussed herein as contemplating a flooring evaluation system where the customer 26 has a contractual relationship with at least one insurer 22, it should also be understood that the present invention also contemplates a flooring evaluation system 10 where the customer 26 may request a flooring evaluation independent of a relationship with at least one insurer 22 (e.g. by communicating directly with the dispatcher 14 via a communication channel 34, and/or one of the flooring evaluators 18 via a communication channel 38).

For each customer 26, insurer 22, and specified flooring 32, the flooring evaluation system 10 generally operates in the same manner, therefore, for purposes of clarity, the flooring evaluation system 10 will generally be discussed hereafter with reference to one customer 26, one insurer 22, and one specified flooring 32.

Figure 2A:
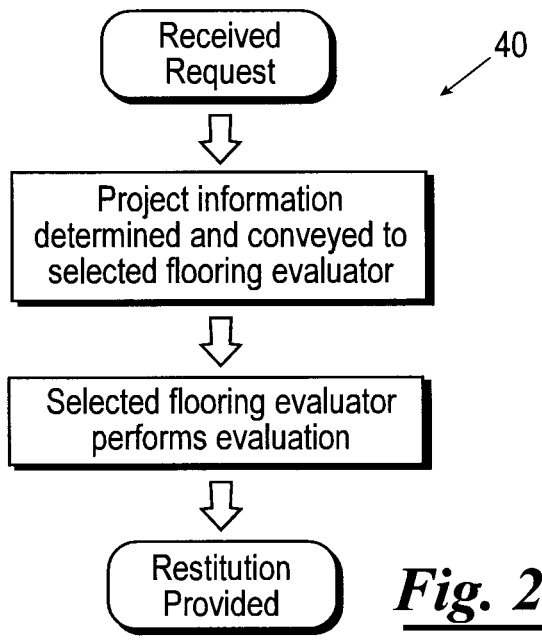
FIG. 2a shows the elements and the logic flow diagram for a flooring evaluation system.

Referring now to FIG. 2a, a logic flow diagram 40 for the flooring evaluation system 10 is shown. In general, when the performance of a flooring evaluation is requested, project information is determined. Project information can include information relating to the customer 26 for the specified flooring, the specified flooring 32, the insurer 22 for the specified flooring 32, insurance coverage provided by the insurer 22 for the specified flooring 32, or combinations thereof. For example, project information can include customer contact information (e.g. name, address, telephone numbers, email address, fax number, preference designations for contact method, location, and/or time for the customer 26). Further, project information can for example include flooring site information (e.g. address of building or structure containing the specified flooring 32), a general flooring description (e.g. type of flooring, position within the flooring site, dimensions, color), and a general damage description (e.g. type of damage, amount of damage, cause of damage, time of damage). Also, project information can include, for example, insurer contact information (e.g. company name, agent name, address, telephone numbers, email address, fax number, preference designations for contact method, location, and/or time for the insurer 22), and also insurance policy coverage details (e.g. deductible amount, maximum monetary restitution limitation, types of damages covered). Other information which can be included in the project information should be apparent to those of ordinary skill in the art.

Generally, the flooring evaluation is requested by the customer 26 and is received by the insurer 22 via a communication channel 42 (see FIG. 1). For example when the specified flooring 32 of the customer 26 is damaged and the customer 26 is seeking a claim for restitution for the damage, such as monetary compensation or replacement or restoration for the damaged specified flooring 32, the customer 26 contacts the insure 22, for example, via telephone. Once the flooring evaluation request is conveyed, the insurer 22 receives and/or determines the project information and then conveys the project information to the dispatcher 14 via the communication channel 30. However, project information can also be received and/or determined by the dispatcher 14. For example, project information can be conveyed by the customer 26 directly to the dispatcher 14 via the communication channel 34, or at least a portion of the project information can be conveyed to the dispatcher 14 by both the customer 26 and the insurer 22. Further, the dispatcher 14 may acquire at least a portion of the project information from previously received project information for a previously performed flooring evaluation for the customer 26 and/or insurer 22, for example, from a local database of the dispatcher 14.

The communication channel 34 and the communication channel 42 may be any communication median capable of conveying and receiving information between the customer 26 and the dispatcher 14 and between the customer 26 and the insurer 22, respectively, such as an analog or digital telephone line, cable, fiber-optic line, wireless or other electronic communication median, human median, and/or any newly developed communication median for communication between the customer 26 and the dispatcher 14 and between the customer 26 and the insurer 22, respectively.

Once the dispatcher 14 has received the project information, the dispatcher 14 utilizes the project information to select at least one flooring evaluator 18 to perform the flooring evaluation of the specified flooring 32. For example, the dispatcher 14 may maintain a database of information relating to the plurality of flooring evaluators 18, such as for example the location, appointment schedule, customer comments, insurer preference, flooring evaluations performed, and/or resources (e.g. manpower, equipment, available time, expertise) of each flooring evaluator 18, so that the dispatcher 14 can identify at least one appropriate flooring evaluator 18 to perform the requested flooring evaluation, from which at least one of the dispatcher 14, insurer 22, or customer 26 may select one flooring evaluator 18 to perform the flooring evaluation. The dispatcher 14 then conveys at least a portion of the project information to the selected flooring evaluator 18 via a communication channel 46.

In another example, the dispatcher 18 can convey at least a portion of the project information to one or more flooring evaluators 18 so that one of the flooring evaluators 18 can agree to perform the flooring evaluation, i.e. select itself to perform the flooring evaluation. For example, the dispatcher 14 can post on an internet website a project listing representative of evaluation requests by the plurality of customers 26, wherein the project listing can also include at least a portion of the project information associated with each evaluation request so that at least one of the plurality of flooring evaluators 18 can review requested evaluations and determine if it has the resources (e.g. manpower, equipment, time, expertise) to perform at least one of the requested evaluations. One flooring evaluator 18 can then indicate a requested evaluation the flooring evaluator 18 agrees to perform, and further request any additional project information desired, and thereby select itself to perform the evaluation of a specified flooring 32.

Although the present invention has been discussed herein above as the at least one flooring evaluator 18 receiving at least a portion of the project information from the dispatcher 14 via the communication channel 46, it should be understood that the present invention also contemplates the at least one flooring evaluator 18 receiving at least a portion of the project information from at least one of the dispatcher 14 via the communication channel 46, the insurer 22 via the communication channel 40, the customer 26 via the communication channel 38, or combinations thereof. The communication channel 46, the communication channel 50, and the communication channel 38 may be any communication median capable of conveying and receiving information between the dispatcher 14 and at least one of the flooring evaluators 18, between at least one of the insurers 22 and at least one of the flooring evaluators 18, and between at least one of the customer 26 and at least one of the flooring evaluators 18, respectively, such as an analog or digital telephone line, cable, fiber-optic line, wireless or other electronic communication median, human median, and/or any newly developed communication median for communication between the dispatcher 14 and the flooring evaluators 18, between the insurers 22 and the flooring evaluators 18, and between the customers 26 and the flooring evaluators 18, respectively.

Further, although the present invention has been discussed herein as the dispatcher 14 selecting at least one flooring evaluator 18 (or allowing one flooring evaluator to select itself), the present invention also contemplates that at least one of the insurer 22 or customer 26 may select one of the flooring evaluators 18 to perform the flooring evaluation of the specified flooring 32, and provide at least a portion of the project information to the selected flooring evaluator 18, independent of the dispatcher 14. For example, at least one of the customer 26 or insurer 22 may convey at least a portion of the project information to a predetermined flooring evaluator 18, such as one named in the insurance policy by the insurer 22, or a flooring evaluator 18 may be selected by the customer 26 from a predetermined list of flooring evaluators 18 provided by the insurer 22. In another example, upon receiving the request for the flooring evaluation, the insurer 22 may receive and convey the project information to a flooring evaluator 18 selected by the insurer 22. In another example, the customer 26 can independently select one of the flooring evaluators 18, for example from a local telephone registry or advertisement, and convey the project information to the selected flooring evaluator 18.

Once one of the flooring evaluators 18 is selected to perform the flooring evaluation of the specified flooring 32 of the customer 26, and is provided with at least a portion of the project information, the dispatcher 14 can further convey to the insurer 22 via communication channel 30, or to the customer 26 via communication channel 34, flooring evaluator information which includes information indicative of the selected flooring evaluator 18 which will perform the flooring evaluation. The flooring evaluator information can include, for example, contact information (e.g. company name, employee name, address, telephone numbers, email address, fax number, and preference designations for contact method, location, and/or time for the flooring evaluator 18). Further, for the convenience of the customer 26, an appropriate time for the selected flooring evaluator 18 to perform the flooring evaluation of the specified flooring can be coordinated and scheduled with the customer 26 by at least one of the insurer 22, the dispatcher 14, or the flooring evaluator 18.

In general, each flooring evaluator 18 is capable of performing a flooring evaluation generally at or near a flooring site to determine evaluation information associated with an evaluated flooring. Generally, evaluation information is information which relates to the flooring evaluation performed and may include information indicative of characteristics of flooring, loss factors of flooring, current monetary market value, devaluated monetary market value, or combinations thereof, associated with the evaluated flooring. Other information relating to the flooring evaluation which may also be included in the evaluation information should be apparent to those of ordinary skill in the art.

In one preferred embodiment, as discussed in further detail below, each flooring evaluator 18 is equipped with evaluation logic which receives input relating to the flooring evaluation and then utilizes such input to calculate, automatically, a value indicative of a monetary worth for at least a portion of the evaluated flooring. In one embodiment, the evaluation logic calculates the monetary worth for at least a portion of the evaluated flooring in terms of a current monetary market value. The term "current monetary market value", as used herein, refers to a market worth of a flooring assuming the flooring in new condition. In another embodiment, the evaluation logic calculates the monetary worth for at least a portion of the evaluated flooring in terms of a devaluated monetary market value. The term "devaluated monetary market value", as used herein, refers to a market worth of a flooring considering loss factors of flooring which cause degradation or deterioration in the flooring due to use during the life of the flooring. The devaluated monetary market value can be calculated using a current monetary market value determined utilizing the evaluation logic, or using a current monetary market value provided to the evaluation logic. Further, the evaluation logic can generate a report indicative of at least a portion of the input received, the calculated current monetary market value, and/or the calculated devaluated monetary market value.

For each flooring evaluator 18 selected to perform a flooring evaluation, the flooring evaluation system 10 generally operates in the same manner, therefore, for purposes of clarity, the flooring evaluation system 10 will be discussed hereafter with reference to one flooring evaluator 18 which has been selected to evaluate the specified flooring 32.

Figure 2C:
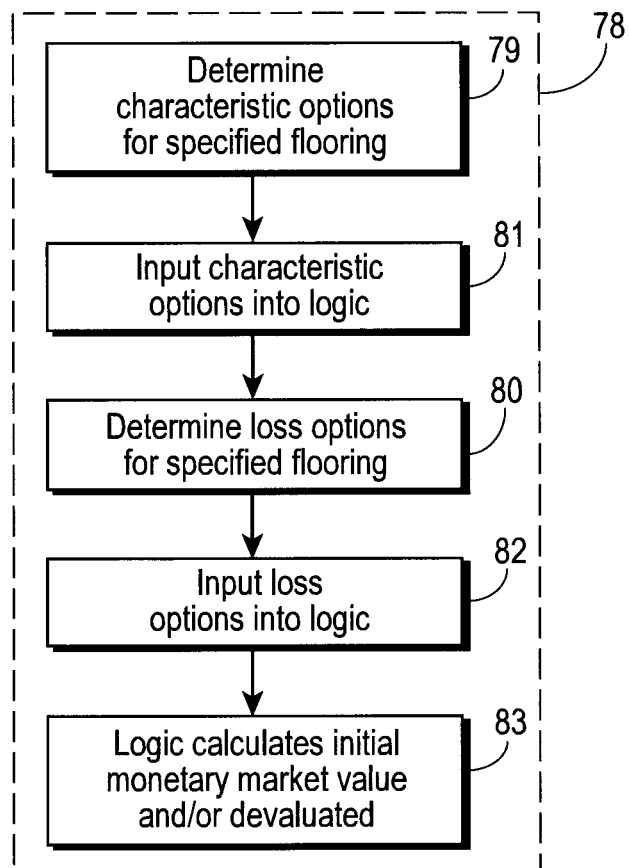
FIG. 2c shows the sub-elements for the logic flow diagram depicted in FIG. 2b.
Figure 2B:
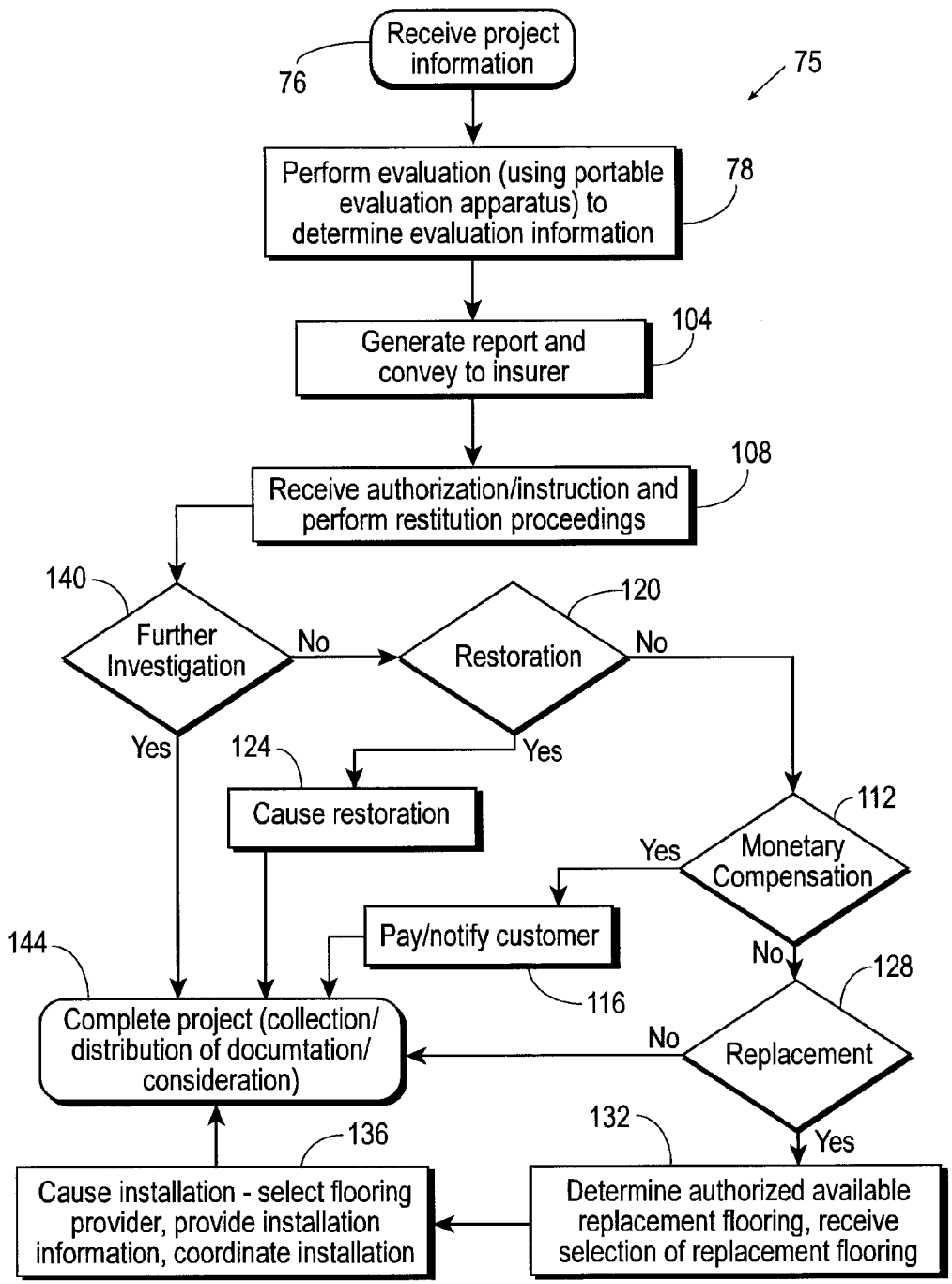

Referring now to FIG. 2b, shown therein is one embodiment of a logic flow diagram 75 for the flooring evaluator 18. Once the flooring evaluator 18 receives at least a portion of the project information (as indicated by a step 76), the flooring evaluator 18 performs the flooring evaluation of the specified flooring 32 generally at or near the flooring site of the specified flooring 32 to determine evaluation information indicative of quantitative and qualitative properties of the specified flooring 32 being evaluated by the flooring evaluator 18 (as indicated by a step 78). As shown in FIG. 2c, in one preferred embodiment, when performing the evaluation of the specified flooring 32 in the step 78, the flooring evaluator 18 determines at least one characteristic option for at least one characteristic of flooring which is indicative of a least a portion of the specified flooring (as indicated by a step 79), and at least one loss option for at least one loss factor of flooring which is indicative of at least a portion of the evaluated flooring (as indicated by a step 80).

The term "characteristics of flooring", as used herein, refers to a distinguishing trait, quality, or property of a flooring, which tends to identify or otherwise affect the market worth of flooring. In general, characteristics of flooring relate to physical properties of flooring, such as for example the type or composition of material a flooring contains; aesthetic qualities such as color, pattern, texture, or construction; dimensions such as height, thickness, weight, face weight, density, or area; and/or any other cost affecting association of a flooring, such as regional availability, manufacture good will, and/or name brand, trademark, copyright, or patent status of a flooring. The characteristics of flooring can also include installation qualities, such as product form, installation form, or bonding material type, and/or protectant qualities, such as backing type, wear layer type, wear layer thickness, waterproofing type, waterproofing layer thickness, stainproofing or soil retardant type, and stainproofing or soil retardant layer thickness. Other characteristics of flooring may be specifically associated with a particular flooring. For example, if the flooring evaluated includes carpet, then characteristics of flooring associated with carpet may further include at least one of fiber type, pile type, pile height, pile twist per unit length, pile density, gauge, stitch rate, style elements, or high style elements. If for example the flooring includes padding, then the characteristics of flooring for padding may further include at least one of hair type or felt type. Other characteristics of flooring should be apparent to those of ordinary skill in the art.

For each characteristic of flooring, there is at least one characteristic option which qualifies or quantifies the characteristic of flooring. The term "characteristic option" as used herein is a definitive trait, quality, or property of flooring. The one or more characteristic options associated with a general characteristic of flooring may be generally defined by or related to an industry standard or availability in the industry. For example, with respect to carpet, if the characteristic of flooring is gauge, then characteristic options for gauge could include for example $1/10$, $1/8$, $5/32$, $3/16$, $3/8$, or if the characteristic of flooring is material type or fiber type, then the characteristic options for material type or fiber type could include for example nylon (premium filament, filament, or staple), olefin, olefin/nylon blend, wool (blended or pure), and polyester. However, a characteristic option for a characteristic of flooring may be an essentially unrestricted variable defined by a particular flooring being evaluated, such as for example, if the characteristic of flooring is the area, then the characteristic option of area would be a variable defined by the evaluated flooring. Typically, more than characteristic option will be associated with the specified flooring. Further, more than one characteristic of flooring can be associated with a characteristic option, such as for example when characteristics of flooring are grouped to more precisely define the trait, quality, or property of flooring, and characteristic options can be the same for different characteristics, or groups of characteristics, of flooring. For example, a characteristic option of $1/4$ inch can quantify the height of a low twist rate, low density pile of carpet, and a characteristic option $1/4$ inch can quantify the height of a high twist rate, high density pile of carpet.

The term "loss factors of flooring", as used herein, refers to elements, circumstances, or influences which tend to contribute to or produce loss or depreciation in quality condition and/or market worth of a flooring caused by use during the life of the flooring. For example, loss factors can include age or time in use, amount or level of staining, amount or level of fading, amount or level of discoloration, wear indications, density change, thickness change, and/or tears, cuts, streaks, holes, or dents present. Other loss factors can be specifically associated with a particular flooring. For example, if the flooring evaluated includes carpet, then the loss factors of carpet may further include at least one of loss of twist, loss of texture, bloom, and/or amount of backing delamination.

For each loss factor of flooring, there is at least one loss option which qualifies or quantifies the loss factor. The term "loss option" as used herein is a definitive, degradative element, circumstance, or influence of flooring. The one or more loss option associated with a loss factor of flooring may be generally defined by or related to an industry standard or to a subjective standard of an observer, such as the flooring evaluator 18. For example, if the loss factor is level of staining, the loss options for the level or staining can be low, medium, or high, wherein the loss options of low, medium, or high are derived from a subjective standard of the flooring evaluator 18, or can be evaluated from an objective percentage determination generally accepted in the industry. However, a loss option for a loss factor of flooring may be an essentially unrestricted variable defined by a particular flooring being evaluated. For example, if the loss factor of flooring is the age, then the loss option would be a variable defined by the evaluated flooring. Typically, more than one loss option will be associated with the specified flooring 32. Further, more than one loss factor of flooring can be associated with one loss option, such as for example when loss factors of flooring are grouped to more precisely define the degradative element, circumstance, or influence of flooring, and loss options can be the same for different loss factors, or groups of loss factors, of flooring.

When performing a flooring evaluation, the flooring evaluator 18 may utilize any method, process, technique, device, machine, or tool in determining the at least one characteristic option and/or the at least one loss option which is indicative of at least a portion of the specified flooring 32. Information indicative of any method, process, technique, device, machine, or tool utilized, including any measurements, data, results, records, pictures, or observations obtained through the utilization of any such method, process, technique, device, machine, or tool can be included as evaluation information.

In one preferred embodiment, the flooring evaluator 18 utilizes a portable evaluation apparatus which is movable to or near the flooring site of the specified flooring 32. The portable evaluation apparatus can include at least one of a vehicle, a computer, a measuring device, a chemical kit, or any other equipment or materials which may aid in conducting measurements, experiments, and calculations at or near the flooring site which may facilitate the flooring evaluation. For example, the portable evaluation apparatus can include at least one of a microscope, a digital or film camera, a laptop computer, hardware, software (e.g. measurement software or flooring recognition software), a scale, a ruler, a chemical, a container, a literary reference, a printer, paper, a scanner, or combinations thereof.

In one preferred embodiment the flooring evaluator 18 further utilizes evaluation logic in the performance of the flooring evaluation. The evaluation logic includes hardware, software, or combinations thereof. In one embodiment, the evaluation logic is software, which can be stored on a computer readable medium comprising at least one substrate. The evaluation logic can be utilized to record project information and to analyze, record, and/or make determinations of evaluation information, including at least one characteristic option and/or at least one loss option indicative of the specified flooring 32 being evaluated. Further, as mentioned above, the evaluation logic can be utilized in determining other evaluation information such as the current monetary market value and/or the devaluated monetary market value of the specified flooring 32.

As shown for example in FIGS. 3-9, in one preferred embodiment, the evaluation logic causes an output device, such as a computer, to provide one or more program modules or GUI's perceivable by a user, such as the flooring evaluator 18. The output device can accept user input provided by the flooring evaluator 18 via at least one input device, such as for example a keyboard, mouse, scanner, touch-screen, voice-recognition, or other similar devices, wherein the user input is accessible by the evaluation logic. The output device may further receive input from other devices which is accessible by the evaluation logic. Further, such input and/or output from the evaluation logic can be stored on a local and/or remote database, e.g. a database of a central processing unit of the output device, or a database of an internet-accessible storage unit.

As shown in FIG. 3, the evaluation logic can provide a program module to the flooring evaluator 18 which has input fields wherein at least a portion of the project information and flooring evaluator information can be inputted and recorded. For example, as shown in FIG. 3, the flooring evaluator 18 can input a customer name and address, flooring site address, flooring type and location, cause of damage, insurer name, insurance policy number, and flooring evaluator name. Further, at least one of the input fields can be provided with data automatically by the evaluation logic, wherein the data is a default value or the data is retrieved from a database using, as a reference, input from one or more of the other input fields. For example, a customer name can be a reference from which an address associated with the customer name is retrieved and automatically entered into the address input field.

Figure 4:
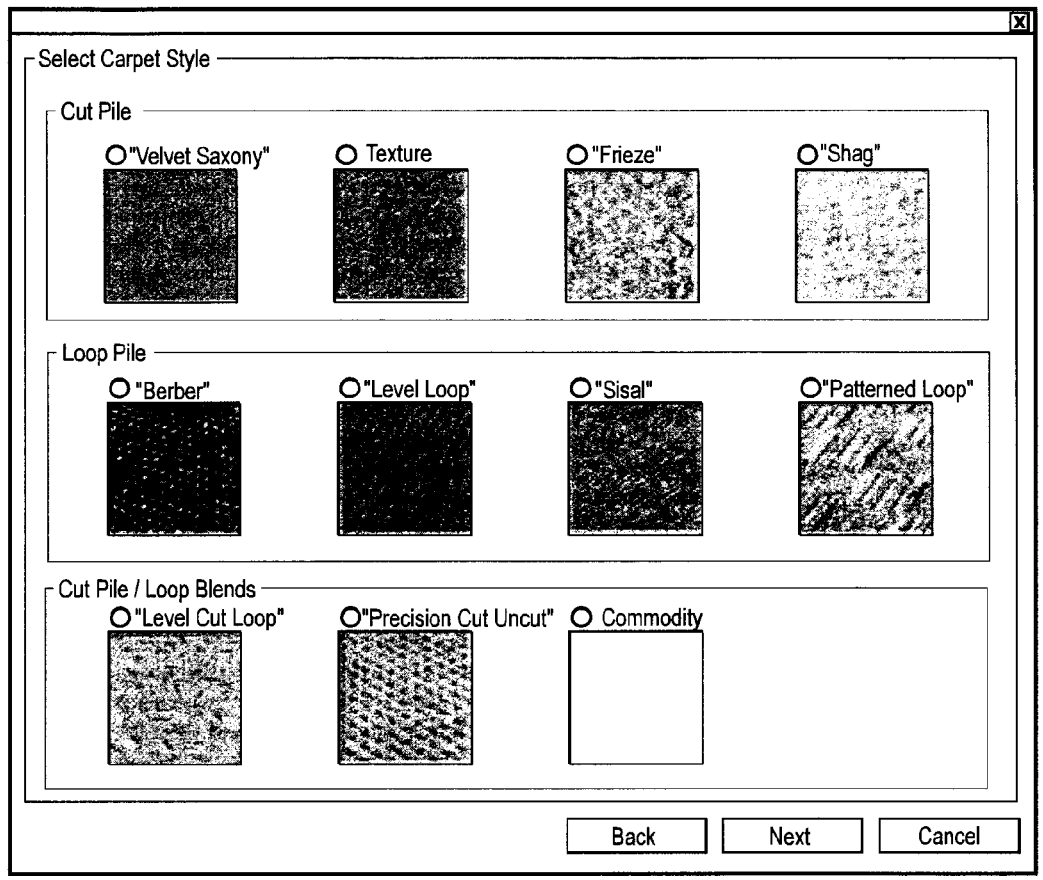
FIGS. 4 and 5 show embodiments of program modules for characteristic option input.
Figure 5:
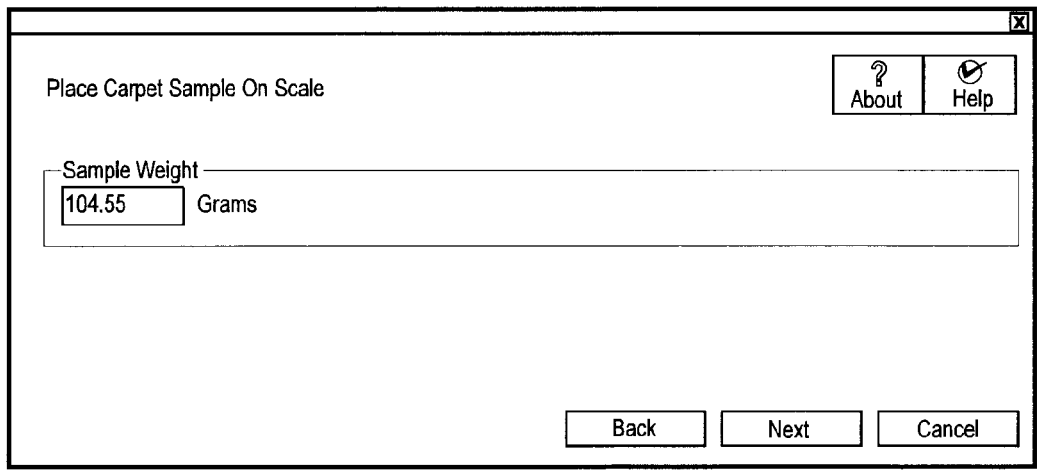

As shown in FIGS. 4-5, the evaluation logic can further cause the output device to selectively output a program module wherein input relating to characteristic options can be received so that a plurality of characteristic options indicative of the specified flooring 32 can be selected or defined thereby providing input to the evaluation logic. In one preferred embodiment, the evaluation logic causes the output device to selectively output a plurality of characteristic options for at least one characteristic of flooring so that at least one characteristic option indicative of the specified flooring 32 can be selected by the flooring evaluator 18, thus providing input indicative of the specified flooring 32 to the evaluation logic (as indicated by a step 81 in FIG. 2c). In such an embodiment, the plurality of characteristic options can be outputted in the form of predetermined input selections, wherein each characteristic option is represented by one or more of a button or dial, a pull-down or scroll menu, a slider, an image, or the like, from which at least one characteristic option indicative of the specified flooring 32 can be selected. For example, as shown in FIG. 4, if the characteristic of flooring is carpet style, the evaluation logic can cause the output device to selective output a plurality of characteristic options for carpet style, such as "Saxony/Velvet", "Texture", "Frieze", "Shag", "Berber", "Level Loop", "Sisal", "Patterned Loop", "Level Cut Loop", "Precision Cut Uncut", and "Commodity" in the form of predetermined input selections represented by images and radial buttons from which the flooring evaluator 18 can select carpet style and provide input indicative of the specified flooring 32.

Further, in another embodiment, so that a plurality of characteristic options can be inputted in the step 81, the evaluation logic can cause the output device to output at least one input field wherein at least one characteristic option can be defined by user input, or by input from another local or remote program or device. For example, as shown in FIG. 5, if the characteristic of flooring is weight (per a predetermine unit area), the characteristic option of weight can be defined by input received from a digital scale capable of outputting a weight value. Further, a characteristic option can be automatically defined by the evaluation logic, wherein the characteristic option is defined by a default value or by data automatically retrieved from a database using, as a reference, data relating to one or more previously selected or defined characteristic options.

After the evaluation logic has received input indicative of the plurality of characteristic options, the flooring evaluator 18 can further utilize the evaluation logic to calculate, automatically, the current monetary market value for at least a portion of the specified flooring (as indicated by a step 83 in FIG. 2c). In one embodiment, to calculate the current monetary market value, each characteristic option selected or defined is assigned a weighted value in the evaluation logic which is indicative of a relational market worth associated with the characteristic option. The weighted value can be assigned to a selected or defined characteristic option in a predetermined manner using predetermined direct associations or a formula.

The evaluation logic utilizes the weighted value assigned to the characteristic options upon which input was received to calculate the current monetary market value for at least a portion of the specified flooring 32. In one embodiment, the calculation of the current monetary market value for at least a portion of the specified flooring 32 utilizes an aggregate of the weighted values assigned to each characteristic option upon which input was received to form a characteristic option score. In one embodiment, the weighted values assigned to each characteristic option upon which input was received are summed to form the characteristic option score. The characteristic option score is then scaled by a multiplier value to form the current monetary market value for at least a portion of the specified flooring 32. In another embodiment, the weighted value assigned to each characteristic option upon which input was received can further account for the multiplier value, and then such weighted values can be summed to form the current monetary market value for at least a portion of the specified flooring 32.

In one preferred embodiment, the multiplier value used to scale the characteristic option score is derived from an average aggregate correlation between the weighted value assigned to each characteristic option and market value. For example, the multiplier value can be derived by assessing a statistically significant and diverse sampling of current products associated with a particular flooring which are available in the market so as to determine correlations between particular characteristic options and/or characteristic option scores associated with the products and market pricing or value for the products. Thus, a generally average market value associated with particular characteristic options and/or characteristic option scores can be utilized to objectively convert the particular characteristic options and/or characteristic option scores into a monetary market worth. In another embodiment, the multiplier value can be a predetermined value which is subjectively defined.

Figure 6:
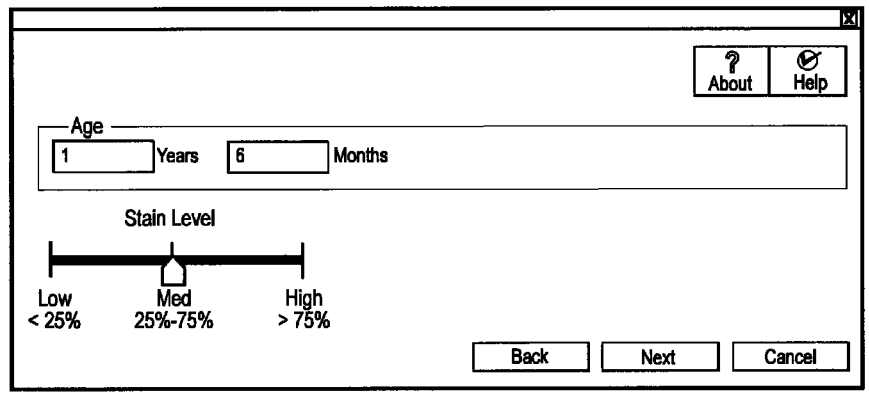
FIGS. 6 and 7 show embodiments of program modules for loss option input.
Figure 7:
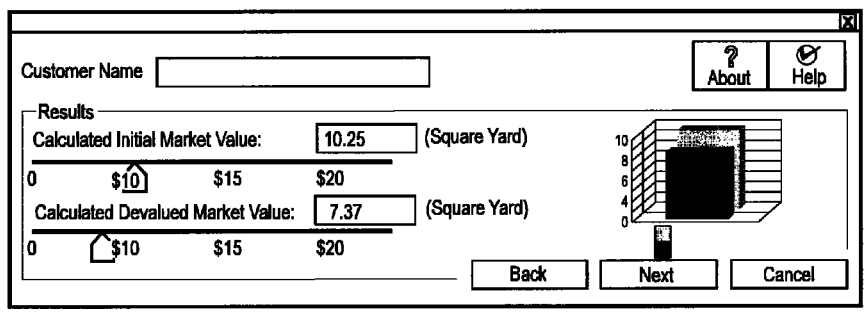
Figure 8A:
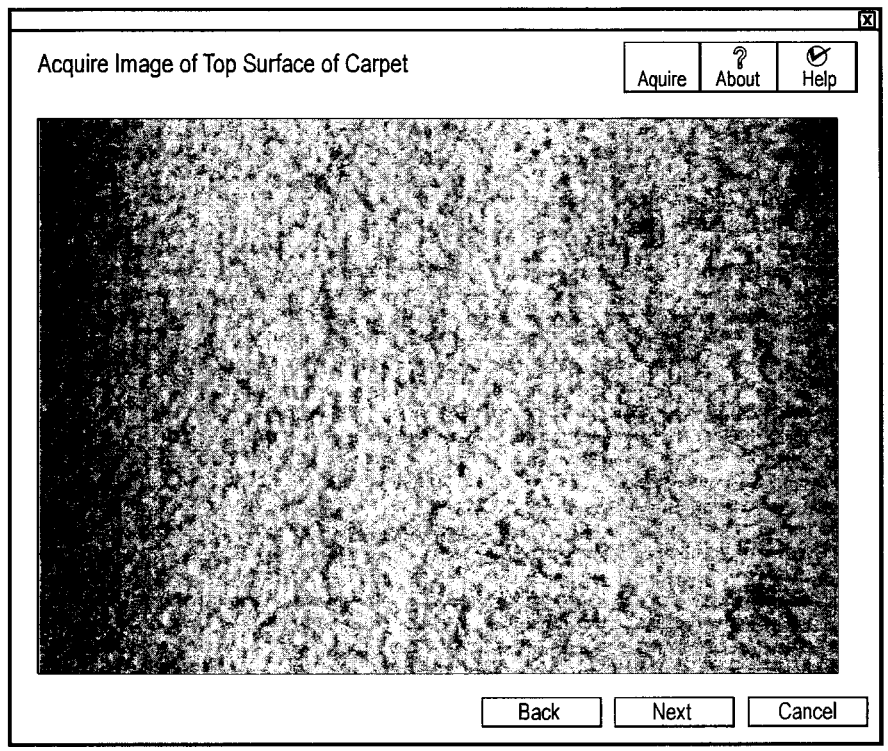
Figure 8B:
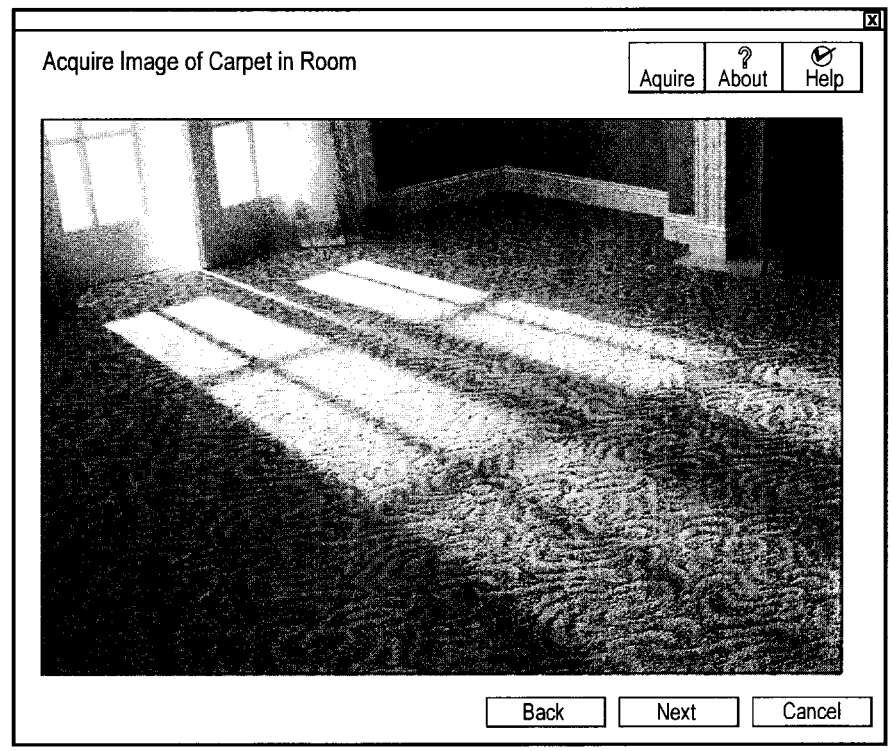
Figure 8C:
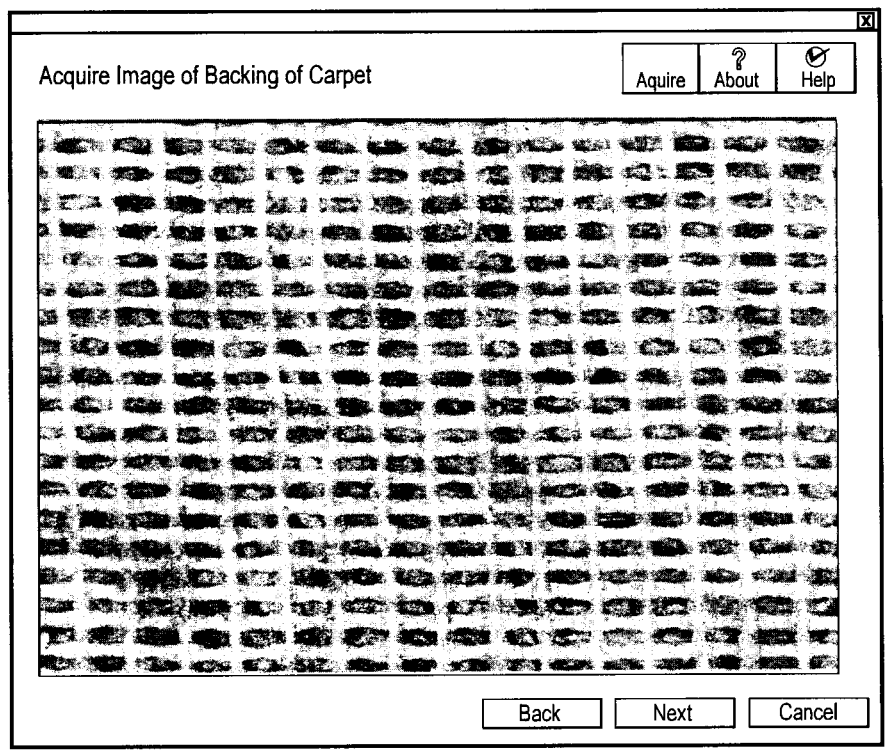
Figure 8D:
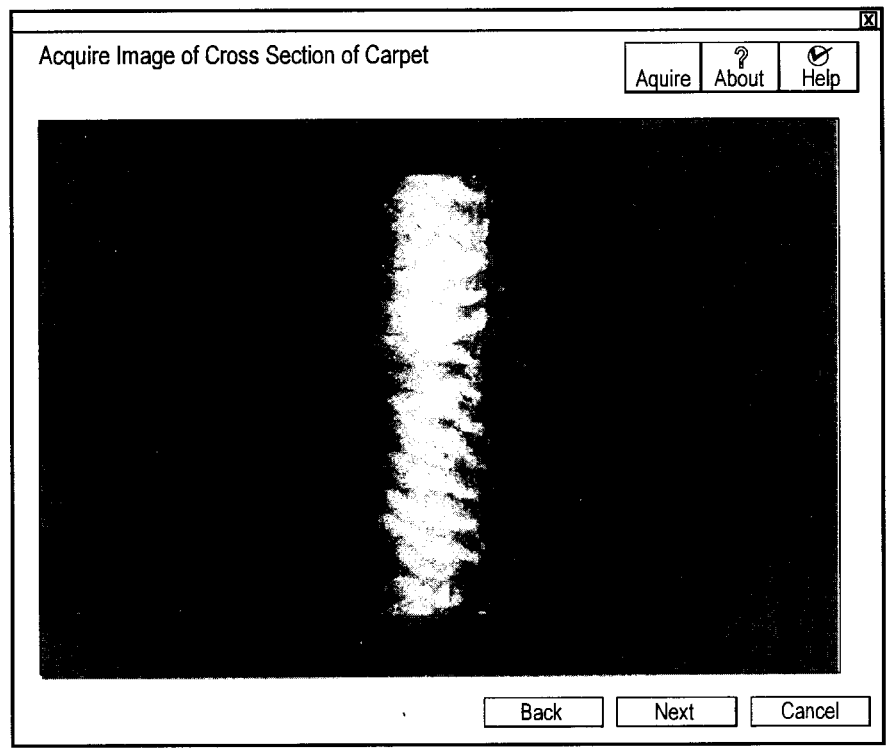
Figure 8E:
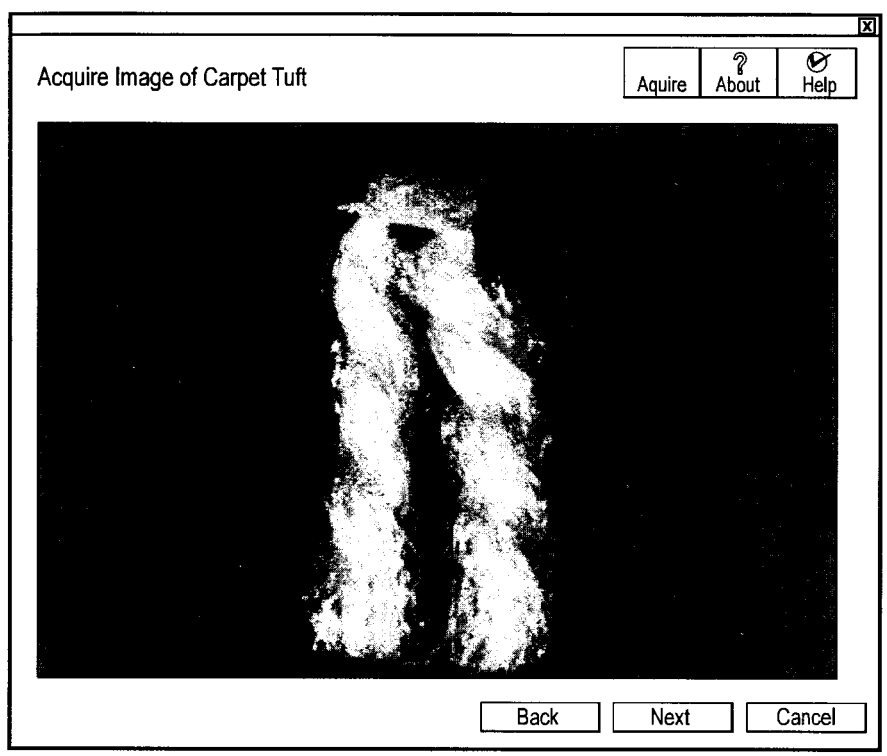

As shown in FIGS. 6-7, the evaluation logic can further cause the output device to selectively output a program module wherein input relating to loss options can be received so that a plurality of loss options indicative of the specified flooring 32 can be selected or defined thereby providing input to the evaluation logic. In one preferred embodiment, the evaluation logic causes the output device to selectively output a plurality of loss options for at least one loss factor of flooring so that at least one loss option indicative of the specified flooring 32 can be selected by the flooring evaluator 18, thus providing input indicative of the specified flooring 32 to the evaluation logic (as indicated by a step 82 in FIG. 2c). In such an embodiment, the plurality of loss options can be outputted in the form of predetermined input selections, wherein each loss option is represented by one or more of a button or dial, a pull-down or scroll menu, a slider, an image, or the like, from which at least one characteristic option indicative of the specified flooring 32 can be selected. For example, as shown in FIG. 6, if the loss factor of flooring is stain level, the evaluation logic can cause the output device to selectively output a plurality of characteristic options for stain level, such as "High", "Medium", and "Low", in the form of predetermined input selections represented by a slider, from which the flooring evaluator 18 can select staining level and provide input indicative of the specified flooring 32. Further, in another embodiment, so that the plurality of loss options can be inputted in the step 81, the evaluation logic can cause the output device to output at least one input field wherein at least one loss option can be defined by user input, or by input from another local or remote program or device. For example, as shown in FIG. 5, if the loss factor of flooring is age, the loss option for age can be defined by input received from the user. Further, a loss option can be automatically defined by the evaluation logic, wherein the loss option is defined by a default value or by data automatically retrieved from a database using, as a reference, data relating to one or more previously selected or defined loss options.

After the evaluation logic has received input indicative of a plurality of loss options, the flooring evaluator 18 can further utilize the evaluation logic to calculate, automatically, the devaluated monetary market value for at least a portion of the specified flooring 32 (as indicated by the step 83 in FIG. 2c). In one embodiment, each loss option selected or defined is assigned a weighted value in the evaluation logic which is indicative of a relational market loss associated with the loss option. The weighted value can be assigned to a selected or defined loss option in a predetermined manner using predetermined direct associations or a formula.

The evaluation logic utilizes the predetermined value assigned to each loss option upon which input was received to calculate the devaluated monetary market value for at least a portion of the specified flooring 32. Further, the evaluation logic utilizes a current monetary market value for at least a portion of the specified flooring in the calculation of the devaluated monetary market value for at least a portion of the specified flooring. The current monetary market value can be a value which is calculated utilizing the evaluation logic in accordance with the present invention, as discussed above, or can be otherwise provided to the evaluation logic, for example, through user input or input provided by another local or remote program or software, so long as the value is representative of a market worth for at least a portion of the evaluated flooring assuming the evaluated flooring is new condition, which can be for example a predetermined, actual, arbitrarily-defined, or assumed value.

In one embodiment, the calculation of the devaluated monetary market value for at least a portion of the specified flooring 32 utilizes an aggregate of the weighted values assigned to each loss option upon which input was received to form a loss option score. In one embodiment, the weighted values assigned to each loss option upon which input was received are summed to form the loss option score, which is then scaled by a multiplier value to form a loss percentage value which is then applied to the current monetary market value of the specified flooring 32 to determine the devaluated monetary market value of the specified flooring 32. The loss value may be limited by at least one of a predetermined minimum value or a predetermined maximum value. The loss value can be a percentage. In another embodiment, the weighted value assigned to each loss option upon which input was received can further account for the multiplier value, and then such weighted values can be summed to form the loss value.

In one preferred embodiment, the multiplier value used to scale the loss option score is derived from an average aggregate correlation between the assigned predetermined value of each loss option and market value loss. For example, the multiplier value may be derived by assessing a statistically significant and diverse sampling of industry association of particular loss options and/or loss option scores associated with a particular flooring and loss of value or worth. Thus, a generally average market loss associated with particular loss options and/or loss option scores can be utilized to objectively convert the particular loss options and/or loss option scores into a percentage or actual value of monetary market loss. In another embodiment, the multiplier value can be a predetermined value which is subjectively defined.

Once the evaluation logic has calculated the current monetary market value and/or devaluated monetary market value for at least a portion of the specified flooring 32, at least one of the calculated current monetary market value or devaluated monetary market value may be outputted by the evaluation logic in a manner perceivable by user, such as the flooring evaluator 18. For example, as shown in FIG. 7, the calculated current monetary market value and the devaluated monetary market value can be outputted in numerical and/or pictorial form to a program module displayed on a monitor and/or a printer of the output device.

Further, the evaluation logic can also allow for input indicative of other information which the user, such as the flooring evaluator 18, wants to record. For example, the flooring evaluator 18 can input additional comments relating to the project in a comment input field, such as shown for example in FIG. 3. As another example, the flooring evaluator 18 can input digital images of at least a portion of the specified flooring 32, such as shown in FIG. 8*a-e*, wherein the specified flooring 32 is shown by way of example to include carpet.

During the performance of the flooring evaluation, the flooring evaluator 18 may further convey at least a portion of the evaluation information to at least one of the customer 26, the insurer 22, or the dispatcher 18. For example, if at the on-site flooring evaluation, the flooring evaluator 18 is using digital images to make measurements or make records, the flooring evaluator 18 could show such digital images to the customer 26, for example on a monitor of a computer, and could also explain any techniques or process he may be applying and/or any conclusion or results determined by the flooring evaluator 18 or other device, such as a for example the computer. By conveying such evaluation information, the customer 26 may be assured that an objective evaluation is being performed.

In one preferred embodiment, the evaluation logic causes the output device, such as the computer, to generate a report 100, such as shown for example in FIG. 9. The generated report 100 can be utilized to provide a digital record, such as for example a computer file, and/or physical record, such as for example a paper printout, of at least a portion of the evaluation information, project information, and/or any other information relating to the project for the specified flooring 32. The report 100 can be provided to at least one of the flooring evaluator 18, customer 26, insurer 22, or dispatcher 18, directly or indirectly, for example, where at least one of the flooring evaluator 18, insurer 22, customer 26, or dispatcher 14 which receives the report 100 can provide the report 100 to at least one of the flooring evaluator 18, insurer 22, customer 26, or dispatcher 14. For example, the flooring evaluator 18 can cause the output device, such as the computer, to output the report 100 to a printer so that it can be provided to the customer 26. In another example, the flooring evaluator 18 can cause the output device, such as the computer, to output the report 100 via the internet, for example via an email, to a database and/or a computer of the insurer 22 and/or dispatcher 14.

In one preferred embodiment, as shown in FIG. 2*b*, the insurer 22 is provided the report 100 by the flooring evaluator 18 (as indicated by a step 104) via the communication channel 50 (see FIG. 1). For example, a printout of the report 100 or an email file containing the report 100, which may include digital photos of at least of a portion of the specified flooring 32, can be sent to a local agent or adjuster at a main office of the insurer 22. Once the insurer 22 receives the report 100, the insurer 22 reviews the evaluation information and/or project information recorded therein and can further convey to the flooring evaluator 18 authorization and/or instructions for restitution proceedings (as indicated by a step 108). The restitution proceedings may include providing monetary compensation to the customer 26 for damage to the specified flooring 32 (as indicated by steps 112 and 116). Further, the restitution proceedings may include restoring or replacing at least a portion of the specified flooring 32 (as indicated by steps 120 and 124, and steps 128, 132, and 136, respectively). The restitution proceedings may also include further investigation by the insurer 22 to determine whether monetary compensation, restoration, or replacement occurs (as indicated by step 140). Further, restitution proceedings may include collection and/or distribution of documentation (e.g. releases, receipts, replacement agreements), with any signatures or other confirmation that may be required, and/or receiving monetary consideration from the customer 26 and/or the insurer 22 (as indicated by a step 144). When the restitution proceedings include replacing at least a portion of the specified flooring 32, the restitution proceedings may further include installation of a replacement flooring or scheduling for the installation of the replacement flooring (as indicated by the step 136).

For example, in step 108, the insurer 22 could authorize a monetary compensation in an amount equal to the value of the devaluated monetary market value recorded in the report 100, or the devaluated monetary market value minus a deductible amount, and instruct the flooring evaluator 18 to, in step 116, dispense such monetary compensation, for example by writing a check backed by funds of the insurer 22, to the customer 26, or the insurer 22 could instruct the flooring evaluator 18 to, in step 116, notify the customer 26 of the authorization and that such monetary compensation will be dispensed to the customer 26 via postal mail or direct deposit into a bank determined by the customer 26. Further, the insurer 22 could instruct the flooring evaluator 18 to, in step 144, acquire a signature on a release form from the customer 26 and provide a copy of the release form to the customer 26. Alternatively, the insurer 22 may, in step 108, authorize the flooring evaluator 18 to cause replacement of the specified flooring 32, wherein the insurer 22 will be liable for a cost no greater than some limited value, such as for example the current monetary market value or devaluated monetary market value recorded in the report 100, or an amount determined by the insurer 22 or predetermined in the insurance policy. Further, the insurer 22 may, in step 108, authorize and/or instruct on the type or quality of replacement flooring.

Although the present invention has been discussed herein above as the at least one flooring evaluator 18 receiving authorization and/or instructions for restitution proceedings from the insurer 22, it should be understood that the present invention also contemplates the flooring evaluator 18 receiving authorization and/or instructions for restitution proceedings from the insurer 18, the customer 26, the dispatcher 14, or combinations thereof. Further, the flooring evaluator 18 may also be provided with predetermined authorization and/or instructions for restitution proceedings, which may for example be specified in the insurance policy for the specified flooring 32 or specified initially in the project information by the insurer 22.

In one preferred embodiment, the flooring evaluator 18 receives authorization and/or instructions for restitution proceedings which includes installation. For example, if the insurer 22 authorizes replacement of the specified flooring 32, then the insurer 22 and/or customer 26 can authorize the installation of replacement flooring and/or instruct on the manner in which the replacement flooring is installed. In another example, if the insurer 22 authorizes monetary compensation, then the customer 26 may further authorize the installation of replacement flooring and/or instruct on the manner in which the replacement flooring is installed. When the restitution proceedings include installation, the restitution proceedings further includes at least one of the customer 26 or the insurer 22 selecting replacement flooring from a plurality of authorized available replacement flooring, wherein the selected replacement flooring will be installed at the flooring site.

In general, each authorized available replacement flooring is flooring which is readily available or accessible in the market, and which falls within an authorized category or range of flooring defined by at least of available monetary funds expendable on replacement flooring (e.g. funds guaranteed by the insurer 22 and/or consideration from the customer 26), the specified flooring 32 being replaced, flooring product type and quality and/or installation preferences specified by the customer 26 and/or insurer 22, general product availability in the market, or combinations thereof.

In one embodiment, the flooring evaluation system 10 further includes a plurality of flooring providers 150, wherein each of the flooring providers 150 is capable of at least one of providing flooring or installing flooring. For example, the plurality of flooring providers 150 can include at least one of a flooring retailer, a flooring installer, a flooring contractor, a flooring supplier, a flooring manufacture, or a flooring mill. Further, each of the flooring providers 150 can be affiliated or independent of at least one of the flooring evaluators 18.

In one embodiment, the flooring evaluator 18 utilizes replacement information, including for example the available monetary funds expendable on replacement flooring and preferences of product type and quality specified by the customer 26 and/or insurer 22, to evaluate flooring provider information for at least one of the flooring providers 150 to determine the plurality of authorized available replacement flooring. The flooring provider information includes information indicative of at least one of accessible stock or quantity of particular flooring, location of particular flooring, possible delivery dates for particular flooring, possible installation dates for particular flooring, pricing for particular flooring, or combinations thereof. For example, a database may be provided which contains flooring provider information for at least one of the flooring providers 150 from which a search can be conducted for flooring falling within a predetermined category of flooring. The predetermined category of flooring can be for example defined by at least one of pricing range, one or more particular characteristics of flooring or particular characteristic options, or possible delivery and installation dates.

Once the plurality of authorized available replacement flooring is determined, at least one of the customer 26 or insurer 22 can select the replacement flooring from one of the plurality of authorized available replacement flooring, wherein the selected replacement flooring will be installed at the flooring site. In one embodiment, the customer 26 and/or insurer 22 is provided with samples or illustrations of at least a portion of each of the plurality of authorized available replacement flooring so as to aid the customer 26 and/or insurer 22 in the selection of the replacement flooring from the plurality of authorized available replacement flooring. For example, the flooring evaluator 18 can provide physical samples of various floorings, which may include for example carpet swatches or tile sections, so as to demonstrate to the customer 26 and/or insurer 22 actual physical properties representative of those associated with at least of portion of each authorized available replacement flooring. Further, the customer 26 and/or insurer 22 may be provided with pictorial or digital illustrations representatives of at least a portion of each authorized available replacement flooring. For example, the flooring evaluator 18 could provide the customer 26 and/or insurer 22, using a computer having a monitor, with virtual representations of at least a portion of at least one authorized available replacement flooring, and/or further with a virtual illustration of the flooring site with at least one authorized available replacement flooring installed, such as for example by altering a digital image of the flooring site with graphics editing or enhancement software.

Once the replacement flooring has been selected, the selected replacement flooring is installed at the flooring site. In one preferred embodiment, at least one flooring provider 150 is selected to participate in the installation of at least a portion of the selected replacement flooring by providing and/or installing the materials or products for at least a portion of the selected replacement flooring. For example, the at least one flooring provider 150 may be a flooring retailer with the materials or products for at least a portion of the selected replacement flooring and manpower which can install the same, wherein the flooring retailer installs at least a portion of the selected replacement flooring at the flooring site. In another example, at least one flooring provider 150 selected may be a mill with the materials or products for at least a portion of the selected replacement flooring which can deliver the same to the flooring site or to a location of another flooring provider 150, such as a flooring installer with manpower which can install the same, and then the flooring installer can install at least a portion of the selected replacement flooring at the flooring site. The at least one flooring provider 150 which is selected to install at least a portion of the replacement flooring can be selected by at least one of the flooring evaluator 18, the customer 26, the insurer 22, or dispatcher 14, or can be selected through the association of the at least one flooring provider 150 with one of the authorized available replacement floorings and/or the selected replacement flooring.

For each flooring provider 150 selected to participate in the installation of replacement flooring, the flooring evaluation system 10 generally operates in the same manner, therefore, for purposes of clarity, the flooring evaluation system 10 will be discussed hereafter with reference to one flooring provider 150 which has been selected to participate in the installation of the replacement flooring.

In one embodiment, after the replacement flooring is selected, at least one of the flooring evaluator 18, the customer 26, the insurer 22, or dispatcher 14, coordinates the installation of the replacement flooring at the flooring site by conveying installation information to the selected flooring provider 150 via communication channels 154, 158, 162, and 166, respectively. The installation information includes information indicative of at least one of the selected replacement flooring, installation scheduling, the flooring site, the customer 26, the insurer 22, or combinations thereof. Further, the installation information can include instructions for receiving payment and/or for collecting and/or distributing documentation (e.g. releases, receipts, replacement agreements), with any signatures or other confirmation that may be required. In one preferred embodiment, the flooring evaluator 18 can convey installation information which includes customer contact information, the insurer contact information, desired installation date, and a description (e.g specifications or dimensions) of the selected replacement flooring and flooring site to the flooring provider 150 via communication channel 154.

The communication channels 154, 158, 162, and 166 may be any communication median capable of conveying and receiving information between the flooring provider 150, and the flooring evaluator 18, customer 26, insurer 22, and dispatcher 14, respectively, such as an analog or digital telephone line, cable, fiber-optic line, wireless or other electronic communication median, human median, and/or any newly developed communication median for communication between the flooring provider 150, and the flooring evaluator 18, customer 26, insurer 22, and dispatcher 14, respectively.

Further, the installation of at least a portion of the selected replacement flooring can be further coordinated by at least one of the flooring provider 150, the flooring evaluator 18, the customer 26, the insurer 22, or dispatcher 14, by scheduling and/or confirming delivery dates and/or installation dates with the customer 26 and/or flooring provider 150. For example, at least a portion of the installation information can be recorded in a local and/or remote database, for example via the internet, from which at least one the flooring provider 150, the flooring evaluator 18, the customer 26, the insurer 22, or dispatcher 14 can access at least a portion of the installation information and/or schedule and/or confirmed delivery and/or installation dates, and record the same on the database.

Once the entire project is complete, i.e. after the performance of the evaluation of the specified flooring and/or restitution proceedings have concluded, completed project information for at least one project can be accumulated and recorded so that such information is retrievable and/or inputtable by at least one of the dispatcher 14, at least one flooring evaluator 18, at least one insurer 22, at least one customer 26, or at least one flooring provider 150. For example, the completed project information may be recorded in a local and/or remote database, for example via the internet. For each specified flooring 32 evaluated and/or replacement flooring installed which is associated with the at least one project, the completed project information may include at least a portion of the project information, evaluation information, restitution proceedings, installation information, or combinations thereof. In one preferred embodiment, the insurer 22 accumulates the project information to run risk analysis studies on the project information. This helps the insurer 22 to more accurately determine costs and trends so that insurance premiums can be set more accurately. The project information can also be utilized to adjust the multiplier values.

EXAMPLE 1

FIG. 10 illustrates one example of the present invention for determining the current monetary market value and the devaluated monetary market value of the specified flooring 32, which by way of example but not by limitation, includes carpet and padding and is located at the home of the customer 26.

A customer request for a flooring evaluation for the specified carpet 32 is received by the dispatcher 14, which also gathers project information. The dispatcher 14 selects one flooring evaluator 18 to perform the flooring evaluation and provides the flooring evaluator 18 with the project information. The flooring evaluator 18 contacts the customer 26 to schedule an appointment for the flooring evaluator 18 to perform the flooring evaluation for the specified carpet 32. The flooring evaluator 18 travels to the home of the customer 26 utilizing the portable lab, which includes the vehicle.

Upon arriving at the home of the customer 26, the flooring evaluator 18 performs the flooring evaluation to determine evaluation information for the specified flooring 32. Typically, the flooring evaluator 18 will take generally macroscopic photographs of the flooring in its installed setting utilizing a digital camera so as to record the general condition of the overall specified flooring 32. The flooring evaluator 18 then collects various cutout samples of the specified flooring 32, generally in a low-traffic area of the specified flooring 32, for example where the specified flooring 32 has been substantially covered by furniture during its use, and in a high-traffic area, for example in a common pathway, such as a hallway. Samples for the padding can be taken in the same manner.

The flooring evaluator 18 takes the samples to the portable lab, where the flooring evaluator 18 utilizes various equipment and techniques to determine characteristic options for various characteristics of flooring and loss options for various loss factors of flooring which are applicable to the specified flooring 32, and inputs the characteristic options and loss options into the evaluation logic, which includes software stored on a laptop computer, by selecting or defining the characteristic options and the loss options indicative of the specified flooring 32 using the program modules selectively outputted by the laptop computer.

The type of carpet fiber can be determined from inspection, touch, chemical or other type of analysis. For example, the flooring evaluator 18 can burn a portion of the carpet fiber and evaluate the look and smell of the burned carpet fiber to determine the carpet fiber type. The flooring evaluator 18 can also use a digital microscope, camera, scanner or combination thereof to determine features of the flooring. For example a "Micro Analysis Module", available from Allasso Industries, Inc. of Raleigh, N.C., which is in communication with the laptop computer, and measurement software and flooring recognition software stored on the laptop computer can be used to measure, determine, and record information indicative of the characteristic options for pile height, pile twists per inch rate, backing type, style elements, and high style elements for the carpet. The flooring evaluator can also use a digital scale in communication with the laptop computer to weigh a predetermined area of the carpet to determine the pile density.

Such evaluation information, including digital images and input indicative of the characteristic options for the carpet, are received by the evaluation logic, for example by user input from the flooring evaluator 18, or from devices in communication with the laptop, such as the microscope or scale, or from other software, which provide input receivable by the evaluation logic. The evaluation logic then calculates, automatically, the current monetary market value for the carpet.

As shown in FIG. 10a, the evaluation logic assigns the selected or defined characteristic options upon which input was received a weighted value which is indicative of a relational market worth associated with each characteristic option. The weighted value can be assigned to a selected characteristic option generally using predetermined direct associations defined in the evaluation logic. For example, as shown in the FIG. 10a, the characteristic options for fiber type, pile height, pile twist, pile density, tufted backing type, style elements and high style elements are assigned weighted values associated with each characteristic option. Further, the weighted value can be assigned to a defined characteristic option using a formula. For example, as shown in FIG. 10a, the characteristic option for tufted carpet ounce weight per square yard and the characteristic option for woven carpet ounce weight per square yard are weighted utilizing a formula which is dependent on the defined value received for the characteristic option.

The evaluation logic forms the characteristic option score by summing the weighted value assigned to each characteristic option upon which input was received. The evaluation logic scales the characteristic option score by a multiplier value, which is generally a ratio of dollar value per unit area, to form the current monetary market value for at least a portion of the carpet (e.g. per square foot). Further, the total area of the carpet of the specified flooring 32 can then used to determine the overall total current monetary market value of the total area of the carpet. Generally, the multiplier value is predetermined by taking a statistically significant sampling of current carpets available in the industry, determining characteristic options for each sample, comparing the weighted value of each characteristic option determined for the sample to a known market value in the industry for the sample so as to determine the average aggregate correlation between the weighted value assigned to each characteristic option and market value.

Further, the flooring evaluator 18 utilizes the various equipment and techniques to determine loss options for various loss factors of flooring for the carpet of the specified flooring 32, and inputs the loss options into the evaluation logic by selecting or defining the loss option for each of the various loss factors of flooring using the program modules selectively outputted by the laptop computer. For example, the flooring evaluator can communicate with the customer 26 or refer to the project information to determine the age of the carpet. The flooring evaluator 18 can also use the microscope and measurement software to measure and record information indicative of the loss options for loss of twist and loss of texture or bloom in terms of high, medium, and low. Further, the flooring evaluator 18 can determine the stain level and fade level of the carpet in terms of high, medium, and low ratings by determining the ratio of areas within the total overall area of the specified flooring 32 where stains and fading are present, respectively, for example through subjective approximations or through the use of digital images and software stored on the laptop.

Such evaluation information, including digital images and input indicative of the loss options for the carpet, are received by the evaluation logic, for example by user input from the flooring evaluator 18, or from devices in communication with the laptop, such as the microscope or scale, or from other software, which provide input receivable by the evaluation logic. The evaluation logic can then be utilize to calculate automatically the devaluated monetary market value for at least a portion of the carpet of the specified flooring 32, generally by reducing the calculated current monetary market value for at least a portion of the carpet.

As shown in FIG. 10b, the evaluation logic assigns the selected or defined loss options upon which input was received a weighted value which is indicative of a relational market loss associated with each loss option. The weighted value can be assigned to a selected loss option generally using predetermined direct associations defined in the evaluation logic. For example, as shown in the FIG. 10b, the loss options for loss of twist, loss of texture, stain level, and fade level are assigned weighted values associated with each loss option. Further, the weighted value can be assigned to a defined loss option generally using a formula. For example, as shown in FIG. 10b, the loss option for age is weighted utilizing a formula which is dependent on the defined value received for the loss option. In the example assignment shown in FIG. 10b, the weighted value assigned to each loss option also accounts for the multiplier value which is representative of an average aggregate correlation for each loss option and market value loss.

The evaluation logic then forms the loss value in terms of a percentage by summing the weighted value assigned to each characteristic option upon which input was received. The loss value is then applied to the calculated current monetary market value to determine an amount the calculated current monetary market value of at least a portion of the carpet (e.g, per square yard) is to be reduced thereby calculating the devaluated monetary market value of at least a portion of the carpet (e.g. per square yard). Further, the total area of the carpet of the specified flooring 32 can then used to determine the overall total devaluated monetary market value of the total area of the carpet.

In a like manner as discussed above for carpet, the flooring evaluator 18 can determine the current monetary market value of the padding. For example, the characteristic options for material type, material weight, material density, hair type, and specialty urethanes can be selected or defined, and assigned a weighted value. Each of the weighted values upon which input was received can be summed and scaled by a multiplier value to determine the current monetary market value of the padding. Since padding is not generally a significant amount of the worth of the specified flooring, devaluation may be of little significance, and to simplify calculations, the devaluated monetary market value of the padding can be considered equal to the current monetary market value of the padding. The total area of the padding of the specified flooring 32 is then used to determine the overall total current monetary market value, and thus the total devaluated monetary market value, of the total area of the padding.

Therefore, to determine the overall total devaluated monetary market value of the total area of the specified flooring 32, the overall total devaluated monetary market value of the total area of carpet is combined with the overall total devaluated monetary market value of the total area of padding.

The flooring provider 18 then generates the report 100 and emails a copy of the report 100 to a local agent of the insurer 22. The local agent reviews the report 100 and then authorizes and instructs the flooring provider 18 that replacement flooring should be installed and the insurer 22 will guarantee funds in an amount equal to the calculated devaluated monetary market value for the specified flooring 32. The flooring provider 18 communicates to the customer and further determines any monetary consideration the customer will provide for replacement flooring. Based on the available monetary funds expendable on replacement flooring and the general carpet and padding qualities that are desired by the customer 26, the flooring evaluator 18 determines a plurality of authorized available replacement flooring by searching databases of flooring provider information. Samples representative of the plurality of authorized available replacement flooring is shown to the customer to aid in the selection of the replacement flooring. Once the customer 26 selects one of the plurality of authorized available replacement flooring as the replacement flooring, the flooring evaluator 18 orders the products and services from the flooring provider 150 associated with the selected authorized available replacement flooring and causes the replacement flooring to be installed on a date mutually agreeable by the customer 26 and the flooring provider 150.

The embodiments of the invention discussed herein are intended to be illustrative and not limiting. Other embodiments of the invention will be obvious to those skilled in the art in view of the above disclosure and appended claims. Changes may be made in the embodiments of the invention described herein, or in the parts or the elements of the embodiments described herein, or in the steps or sequence of steps of the methods described herein, without departing from the spirit and/or the scope of the invention.

What is claimed is:

1. A method for on-site flooring evaluation by a flooring evaluator of at least one portion of a specified flooring to be replaced, comprising the steps of:

receiving project information from an insurer, the project information provided by an output device utilizing project management logic run by one or more computer of a flooring evaluation system, wherein the project information is indicative of a claim filed by a customer, and comprises at least one of the following: customer contact information, general type of flooring, type of flooring damage, customer site location, date and time of valuation, and insurer information; and travelling to the customer site location with a portable evaluation apparatus including a mobile evaluation vehicle, a computer and at least one of: a measuring device, a chemical kit, a microscope, a digital camera, a scale, a ruler, a printer, software, paper, a scanner, and a literary reference; and collecting at least one sample of the specified flooring and analyzing said sample with the portable evaluation apparatus; and inputting data indicative of characteristic options of the specified flooring into the computer; and determining, using the computer, the market value for at least a portion of the specified flooring; and providing output regarding the determined market value as derived by the computer.

2. The method of claim 1, wherein the computer determines the market value of at least a portion of the flooring by utilizing an assigned weighted value indicative of a relational market worth associated with at least one characteristic option upon which input was received.

3. The method of claim 2, wherein the flooring evaluator determines at least one characteristic option for at least one characteristic of flooring which is indicative of at least a portion of the specified flooring.

4. The method of claim 3, wherein the flooring evaluator further determines at least one loss option for at least one loss factor of flooring which is indicative of at least a portion of the evaluated flooring.

5. The method of claim 4 wherein the flooring evaluator inputs information regarding the selected at least one characteristic and the at least one of the loss factors into the computer.

6. The method of claim 5, wherein the step of calculating, automatically, the current monetary market value for at least a portion of the specified flooring comprises utilizing an aggregate of the assigned weighted values of the characteristic options upon which input was received to form a characteristic option score which is scaled by a multiplier value to form the current monetary market value for at least a portion of the specified flooring.

7. The method of claim 6, wherein the multiplier value is derived from an average aggregated correlation between the weighted value assigned to each of the at least one characteristic options upon which input was received and market value.

8. The method of claim 1, wherein the output is provided to at least one of: the insurer, the customer, a replacement flooring installer, a replacement flooring retailer, and a replacement flooring manufacturer.

* * * * *